(12) United States Patent
Kjallstrom et al.

(10) Patent No.: US 9,600,938 B1
(45) Date of Patent: Mar. 21, 2017

(54) 3D AUGMENTED REALITY WITH COMFORTABLE 3D VIEWING

(71) Applicant: EON REALITY, INC., Irvine, CA (US)

(72) Inventors: Jan Kjallstrom, Monarch Beach, CA (US); Simon Kim Ivarsson, Gothenburg (SE)

(73) Assignee: EON REALITY, INC., Irvine, CA (US)

( * ) Notice: Subject to any disclaimer, the term of this patent is extended or adjusted under 35 U.S.C. 154(b) by 3 days.

(21) Appl. No.: 14/951,369

(22) Filed: Nov. 24, 2015

(51) Int. Cl.
*G06T 19/00* (2011.01)
*G06T 19/20* (2011.01)
*H04N 13/04* (2006.01)

(52) U.S. Cl.
CPC .............. *G06T 19/006* (2013.01); *G06T 7/70* (2017.01); *G06T 19/20* (2013.01); *H04N 13/0409* (2013.01); *H04N 13/0497* (2013.01); *G06T 2207/10016* (2013.01); *G06T 2207/30204* (2013.01); *G06T 2207/30244* (2013.01); *G06T 2219/2004* (2013.01)

(58) Field of Classification Search
CPC .................... G06T 19/006; G06T 19/20; G06T 2219/2004; G06T 7/004; G06T 7/70
See application file for complete search history.

(56) References Cited

U.S. PATENT DOCUMENTS

| | | | |
|---|---|---|---|
| 2011/0304710 A1* | 12/2011 | Ito ............................ | A63F 13/10 348/51 |
| 2012/0120200 A1* | 5/2012 | Newton ............. | H04N 13/0003 348/46 |
| 2012/0139906 A1* | 6/2012 | Zhang .................. | H04N 13/004 345/419 |
| 2016/0063762 A1* | 3/2016 | Heuvel ................... | G06F 3/011 345/633 |

\* cited by examiner

*Primary Examiner* — Jeffery A Brier
(74) *Attorney, Agent, or Firm* — Innovation Capital Law Group, LLP; Vic Lin (57) ABSTRACT

Systems and methods directed to augmented reality environments on mobile devices having a single camera are disclosed. The single camera of the mobile device captures the images of one or more markers, and based on the relative size of the markers, determines the position of the camera and the absolute distance relative to the markers. The mobile device establishes a zero parallax plane set at the bottom of the 3D virtual object superimposed on the physical marker. Reduced alignment errors occur between the lower end of the virtual object and the real-world markers, and the virtual object appears to be standing on the real-world object. As a result, the augmented reality stereo experience for the user is more comfortable as the display is matched between virtual objects and the real objects to make the overall scene more realistic.

20 Claims, 8 Drawing Sheets

3D AUGMENTED REALITY WITH COMFORTABLE 3D VIEWING

BACKGROUND OF THE INVENTION

1. Field of the Invention

The present invention relates in general to augmented and virtual reality environments. More particularly, the invention is directed to combining three-dimensional virtual objects with two-dimensional video.

2. Description of the Related Art Augmented reality environments combine images of real-world objects with computer generated virtual objects. Systems having more than one camera may generate and synchronize the placement of three-dimensional virtual objects superimposed over three-dimensional images of real-world objects such that the alignment error between the virtual and real-world images is reduced.

However, most commercially available smart phones have only one, forward looking camera. In many applications, the smart phone simply clones the images of the real-world object to provide identical left and right perspective views of the real-world environment. However, smart phones having a single camera may experience problems when the display attempts to superimpose a true stereoscopic image from a three-dimensional ("3D") computer graphic virtual object on top of a two-dimensional video of a real-world environment. For example, users may experience a problem focusing when they attempt to focus their eyes on the bottom of a 3D virtual object where virtual object is rendered on top of a real-world, printed augmented reality marker. Users attempt to focus on two objects: one computer generated 3D virtual object, and one real object having no stereo separation that should appear to be at the same physical location. In many cases, the images of the virtual and real-world objects appear to be positioned at different distances from the smart phone, and create an uncomfortable viewing experience.

Accordingly, a need exists for improving augmented reality environments for mobile devices having a single, forward-looking camera.

SUMMARY OF THE INVENTION

In the first aspect, a machine implemented method for generating an augmented reality environment is disclosed. The method comprises receiving images of a reality-based environment with a computing device having a single camera, the reality-based environment having one or more real physical objects, the computing device having a display, determining the distance and orientation of the camera relative to the real physical objects, and determining a location of a zero parallax plane in the reality-based environment. The method further comprises generating a first and a second perspective view of one or more computer-generated, three-dimensional virtual objects, the virtual objects registered to the real physical objects based on the zero parallax plane, and displaying the first and second perspective views on the display of the computing device.

In a first preferred embodiment, the reality-based environment further comprises one or more markers. The location of the zero parallax plane is preferably positioned at the bottom portion of the virtual object. Determining the distance and orientation of the camera relative to the real physical objects preferably comprises determining the distance of the camera relative to the real physical objects based on a relative scale size of the images of the real physical objects, and determining the orientation of the camera relative to the real physical objects based on a relative positioning of the images of the real physical objects. The method preferably further comprises altering the first and second perspective views in response to a change in the distance or orientation of the camera relative to the real physical objects. The first and second perspective views preferably comprise views of the virtual objects and the images of the reality-based environment. The first and second perspective views preferably comprise views of the virtual objects without the images of the reality-based environment.

The method preferably further comprises continuously monitoring the images of the reality-based environment, continuously synchronizing the position of the zero parallax plane between the marker and the virtual object, and continuously updating and registering the first and second perspective views of the virtual object. The first perspective view is preferably displayed on the left side of the display, the second perspective view is preferably displayed on the right side of the display, and the first perspective view preferably differs from the second perspective view.

In a second aspect, a machine readable non-transitory medium storing executable program instructions which, when executed, cause a data processing system to perform a method is disclosed. The method comprises receiving images of a reality-based environment with a computing device having a single camera, the reality-based environment having one or more real physical objects the computing device having a display, determining the distance and orientation of the camera relative to the real physical objects, and determining a location of a zero parallax plane in the reality-based environment. The method further comprises generating a first and a second perspective views of one or more computer-generated, three-dimensional virtual objects, the virtual objects registered to the real physical objects based on the zero parallax plane, and displaying the first and second perspective views on the display of the computing device.

In a second preferred embodiment, the reality-based environment further comprises one or more markers. The location of the zero parallax plane is preferably positioned at the bottom portion of the virtual object. Determining the distance and orientation of the camera relative to the real physical objects preferably comprises determining the distance of the camera relative to the real physical objects based on a relative scale size of the images of the real physical objects, and determining the orientation of the camera relative to the real physical objects based on a relative positioning of the images of the real physical objects. The method preferably further comprises altering the first and second perspective views in response to a change in the distance or orientation of the camera relative to the real physical objects. The first and second perspective views preferably comprise views of the virtual objects and the images of the reality-based environment. The first and second perspective views preferably comprise views of the virtual objects without the images of the reality-based environment.

The method preferably further comprises continuously monitoring the images of the reality-based environment, continuously synchronizing the position of the zero parallax plane between the marker and the virtual object, and continuously updating and registering the first and second perspective views of the virtual object. The first perspective view is preferably displayed on the left side of the display, the second perspective view is preferably displayed on the right side of the display, and the first perspective view preferably differs from the second perspective view.

In a third aspect, a mobile device is disclosed. The mobile device comprises a single camera, and at least one processing system coupled to the single camera, the at least one processing system having one or more processors configured to generate an augmented reality environment, the at least one processing system operable to perform the operations including receiving images of a reality-based environment with a computing device having a single camera, the reality-based environment having one or more real physical objects, the computing device having a display, determining the distance and orientation of the camera relative to the real physical objects, and determining a location of a zero parallax plane in the reality-based environment. The operations further comprise generating a first and a second perspective views of one or more computer-generated, three-dimensional virtual objects, the virtual objects registered to the real physical objects based on the zero parallax plane, and displaying the first and second perspective views on the display of the computing device.

In a third preferred embodiment, the at least processing system is further operable to perform the operations comprising continuously monitoring the images of the reality-based environment, continuously synchronizing the position of the zero parallax plane between the marker and the virtual object, and continuously updating and registering the first and second perspective views of the virtual object.

These and other features and advantages of the invention will become more apparent with a description of preferred embodiments in reference to the associated drawings.

DETAILED DESCRIPTION OF THE PREFERRED EMBODIMENTS

One or more embodiments are directed to systems and methods for combining computer generated, virtual objects with images of real-world objects in an augmented reality environment on devices having a single, forward looking camera. One or more embodiments are directed at providing a "comfortable" view of the augmented reality environment.

Stereoscopic virtual and augmented reality environments provide different perspective views to a user's left and right eyes, enabling a user to perceive three-dimensional objects. These stereoscopic virtual reality environments exploit the brain's natural ability to process these different perspective views from the left and right eyes such that a user may perceive a three-dimensional world. The human brain fuses the perspective views from the left and right eyes into one cognitive experience called stereopsis, which allows the brain to perceive the real world in stereo.

But there are limits to which the human brain will process images from the left and right eyes. For example, when a person looks at a nearby object in the real world, like a finger placed close to a person's nose, the person may see duplicate images of an object further away. However, if the person focuses on the distant object, the image of the finger will duplicate into two images. When the closest convergence point angle and distance are excessively disparate, the person's brain breaks fusion and stereopsis which cause visual discomfort. The breaking of the fusion is the main cause of uncomfortable stereography.

In virtual and augmented reality environments, the stereo effect may be achieved by having a positive, negative, or zero parallax indicating the virtual object position with respect to a projection plane. In environments depicting positive parallax, the virtual object appears to be behind the projection plane; and for environments depicting negative parallax, the virtual object appears to be in front to the projection plane. For environments depicting zero parallax, the virtual object appears to be positioned at the projection plane. When the virtual object is located at the zero parallax plane, the issues of uncomfortable stereography are reduced.

In order to provide a comfortable stereoscopic experience for a user, geometric registration issues must be addressed. These issues include geometric alignment and the resolution of occlusion between real and virtual objects. In one or more embodiments, the zero parallax plane is placed on a marker in the real world. While it is impossible to get a perfect match with a stereoscopic computer generated virtual rendered object on top of a two-dimensional ("2D") video, the rendering errors will be reduced in this scenario.

In one or more embodiments, a mobile device having a single, forward-looking camera is employed. In one or more embodiments, other cameras on the device may be employed. One or more markers are placed in the real-world environment. The camera of the mobile device captures the images of the markers, and based on the relative size of the markers, determines the absolute distance and orientation of the camera relative to the markers. In one or more embodiments, each marker is examined one marker at a time. One or more embodiments may use one physical marker. However, it's important to point out that the physical markers size should have a similar size as the virtual AR markers dataset that (in this case) is generated on based on the image that is printed out. And the size of the image that is employed to create the AR marker dataset is used inside software to get a reference size to be used when calculating the distance to the camera.

In one or more embodiments, each marker is a fixed image pattern that is pre-programmed and will not change when the application is run. The unique pattern on each image will be used to determine the distance to the camera (normal AR logic).

In one or more embodiments, the zero parallax plane is positioned at the bottom of the three-dimensional ("3D") virtual object superimposed on the physical marker. This results in reduced alignment errors at the lower end of the virtual object so that the virtual object appears to be standing on the real-world object. One or more embodiments use the approximate position and orientation of the device (as long as the markers physical size corresponds to the virtual marker) and use that to match the stereo separation of the augmented object with the video fed real background. One benefit of these embodiments is to make the see-through stereo AR comfortable and make the matching between virtual objects and the real objects in the scene realistic.

In one or more embodiments, the zero-parallax plane is placed at the intersection of the lower part of the object that is "standing" on top of the marker visible from the video. The zero-parallax plane may be placed on the bottom of the virtual object. One or more embodiments may employ wall-mounted markers, where the zero parallax plane is placed at the rear portion of the object.

In one or more embodiments, the zero-parallax plane is placed at the reality-based marker as well as the virtual object and/or that the virtual object is placed on/at the marker.

As used herein and as is commonly known in the art, the terms "virtual," "augmented," "augmented reality environment," and "augmentation" may refer to items which are added to a display of a real scene, and may include computer generated icons, images, virtual objects, text, or photographs. Specific embodiments described herein may refer to an augmented reality environment or a virtual reality environment. However, it shall be understood that the specific use of either an augmented reality environment or a virtual reality environment is for illustration purposes only, and that concepts described herein may be applied to either augmented or virtual reality environments.

Figure 1:
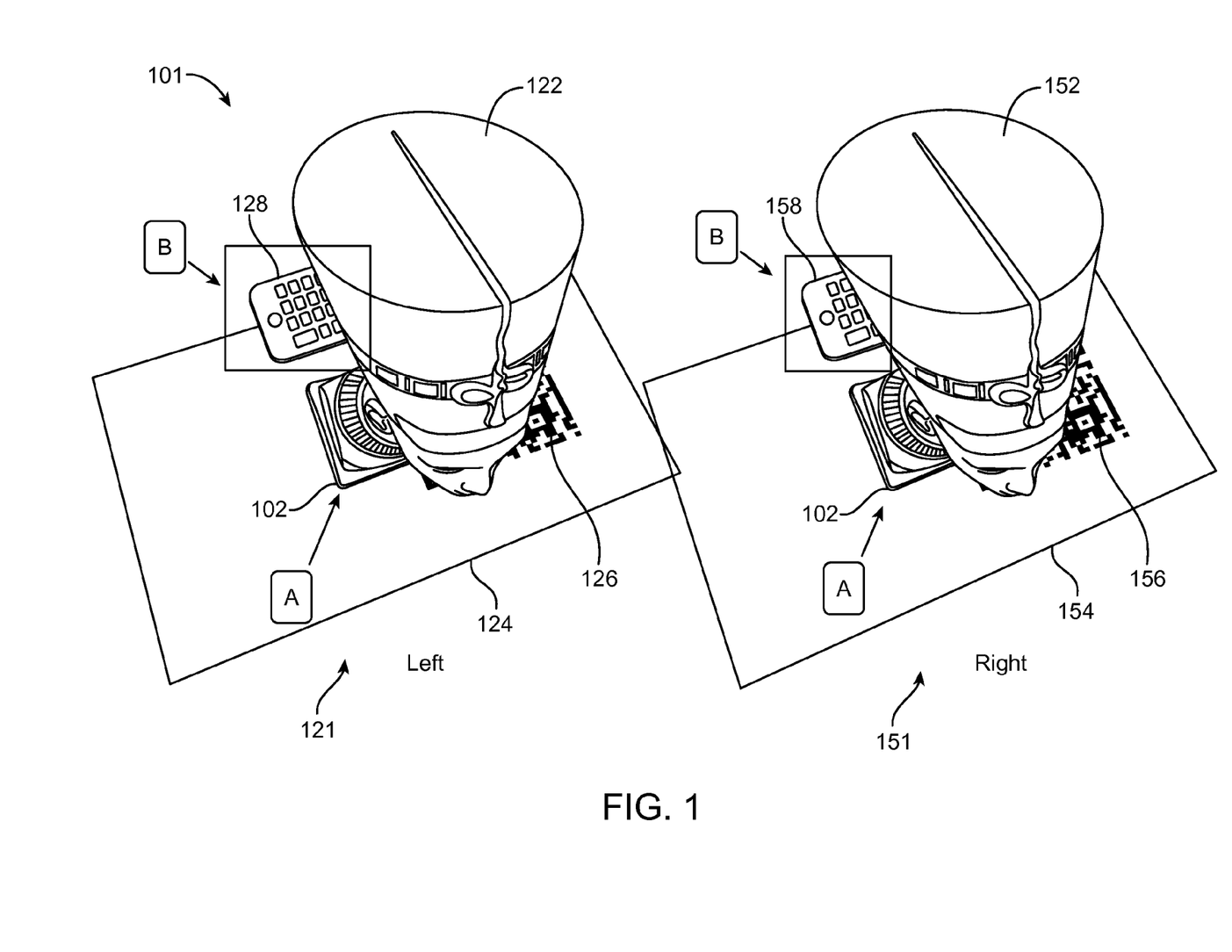
FIG. 1 is a top, perspective view of the images displayed to the left and right eyes of a user.

Reference made herein to a mobile device is for illustration purposes only and shall not be deemed limiting. Mobile device may be any electronic computing device, including handheld computers, smart phones, tablets, laptop computers, smart devices, GPS navigation units, or personal digital assistants for example VR Eyewear. The terms "real object" or "real-world" refer to physical, tangible real-world objects and the term "real object image" or "image of a real object" refer to the image captured, processed, and displayed in a mobile device display. The term "reality based environment" refers to one or more physical, tangible real-world objects. In one or more embodiments, the image of a real object may refer to paper or markers. One or more embodiments may employ AR target markers including, but not limited to, image markers, cloud targets, multi-targets. object targets, user defined targets, frame markers, and words, FIG. 1 depicts an augmented reality environment 101 having left and right perspective views 121 and 151 displayed to the left and right eyes of a user. In the left perspective view 121, the left image of the virtual object 122 (i.e., a statue in this example) is shown resting on the left image of a sheet of paper 124 with the base of the virtual object 122 immediately above left image of one or more markers 126. Likewise, the right perspective view 151, the right image of the virtual object 152 is shown resting on the right image of a sheet of paper 154 with the base of the virtual object 152 immediately above right image of the markers 156.

The zero parallax plane 102 is placed at the base of the virtual object 122/152 indicated by the label "A." In one or more embodiments, the term "focus" refers to the distance from the camera to the position of the "stereo zero parallax" or zero parallax plane 102. There are several ways to describe the stereo zero parallax distance. The stereo zero parallax distance may be thought of as the distance from the camera to a position from which objects closer than this point appear to coming out of the display screen. Also, the stereo zero parallax distance may also be thought of as the distance where the separation between left and right images 121 and 151 at this point is zero.

In one or more embodiments, the computer generated ("CG") virtual objects are rendered with the 2D images of the real-world. The 2D images are identical for left and right eyes having no stereo separation and are positioned at the intersection point of the CG image and the physical marker (i.e., labeled as point "A" on FIG. 1).

In one or more embodiments, the distance from the camera to the markers may be determined based on the relative size of the images of the markers when the sizes of both the physical printed markers and the virtual markers are known. Once the {x, y, z} position is known, the scale size of the marker may be used to determine the absolute distance. Knowing the absolute distance, the zero parallax plane is positioned where the bottom of the 3D virtual object is superimposed the same place as the physical marker (point "A").

While it is impossible to get a perfect match with a stereoscopic CG rendered object on top of a 2D video, the rendering errors will be significantly less. As depicted in FIG. 1, the alignment error is reduced between 3D virtual object and printed marker at point "A." Referring now to point "B," the separation between the top of the virtual statue and the image of the real-world calculator on the table differs between the left and right perspective views 121 and 151. For example, the left perspective view 121 of the left image of the calculator 128 exposes more surface of the calculator than does the right perspective view 151. This results in less alignment errors between the lower end of the statue so that it looks like it is standing on the table at the same time as the top of the statue looks like it is coming out from the real table on which it is "standing." In one or more embodiments, the use of a single camera enables 3D virtual objects to be overlaid in a see-through augmented reality application having reduced alignment errors.

Figure 2:
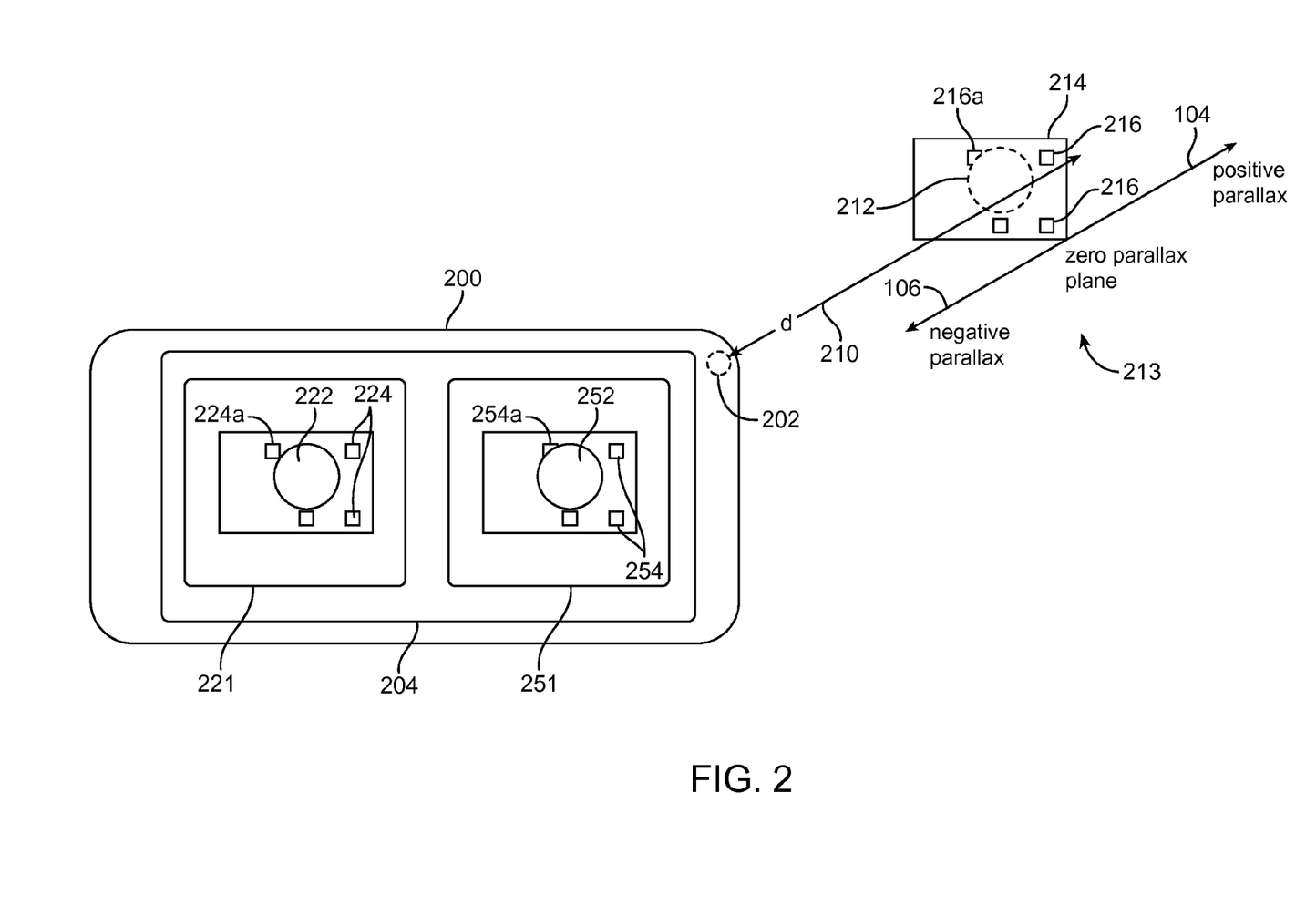
FIG. 2 is a front, schematic view of a display of a mobile device capturing the image of markers and generating left and right perspective views of a three-dimensional virtual object.

FIG. 2 is a front, schematic view of a display 204 of a mobile device 200. The mobile computing device 200 comprises a single, forward-looking camera 202, and a display 204 which generates the images received by the camera 202. In one or more embodiments, the display 204 may have a first perspective view 221 (i.e., the left perspective view) and a second perspective view 251 (i.e., the right perspective view) of the real-world sheet of paper 214 having one or more markers 216. The camera 202 views the real-world objects 214 and 216, and displays the left and right perspective views 221 and 251 of the real-world objects 214 and 216 on the display 204. In one or more embodiments, the mobile device 202 is configured to generate one or more virtual objects such as virtual object 212 represented in this example as a sphere. The left and right images of the virtual object 222 and 252 are displayed in the left and right perspective views 221 and 251. Note that marker 216a may be seen in the left perspective view 221 as marker image 224a, but is more obscured in the right perspective view 251 as marker image 254a. The first perspective view 221 differs from the second perspective view 251 in one or more embodiments.

In one or more embodiments, the mobile computing device 200 is configured to receive images of a reality-based environment 213 having a single, forward looking camera 202, where the reality-based environment 213 has one or more real physical objects such as sheet 214 and the markers 216. The mobile computing device 200 has a display 204.

In one or more embodiments, the mobile computing device 200 views the markers 214 having a known size, and determines the distance 210 ("d") of the camera 202 relative to the real physical objects 216 based on the relative scale size of the images of the real physical objects 224 and 254. In addition, mobile computing device 200 also determines the orientation of the camera 202 relative to the real physical objects 213 based on the relative positioning of the images of the real physical objects such as markers 224 and 254.

The mobile computing device 200 then determines the zero parallax planes 102 in the reality-based environment 213. In one or more embodiments, the zero parallax plane 102 is positioned at the rear or bottom portion of the virtual object such as virtual object 212. The zero parallax plane 102 may be coincident with the sheet 214 having the markers 216 as illustrated in FIG. 2.

The mobile computing device 200 is further configured to generate first and second perspective views 221 and 251 of one or more computer-generated, three-dimensional virtual objects 212, the virtual objects 212 registered to the real physical objects 213 based on the zero parallax plane 102. The mobile computing device 200 displays the first and second perspective views 221 and 251 on the display 204 of the computing device 200.

The zero parallax plane 102 establishes the regions of negative parallax 106 and positive parallax 104. Virtual objects "positioned" on the zero parallax plane 102 have identical images in the left and right perspective views 221 and 251. Virtual objects positioned in the region of positive parallax 104 appear to be behind the zero parallax plane 104, which in this case, would appear to be behind the sheet and markers 214 and 216. As illustrated in FIG. 2, virtual objects such as virtual object 212 positioned in the region of negative parallax 106 appear to be in front of the zero parallax plane 104, which in this case, would appear to be in front of the sheet and markers 214 and 216. The virtual object 212 appears to be standing on the sheet 214 as a result of the mobile computing device 200 positioning the zero parallax plane 102 on sheet 214 on the bottom surface of the virtual object 212.

Figure 6:
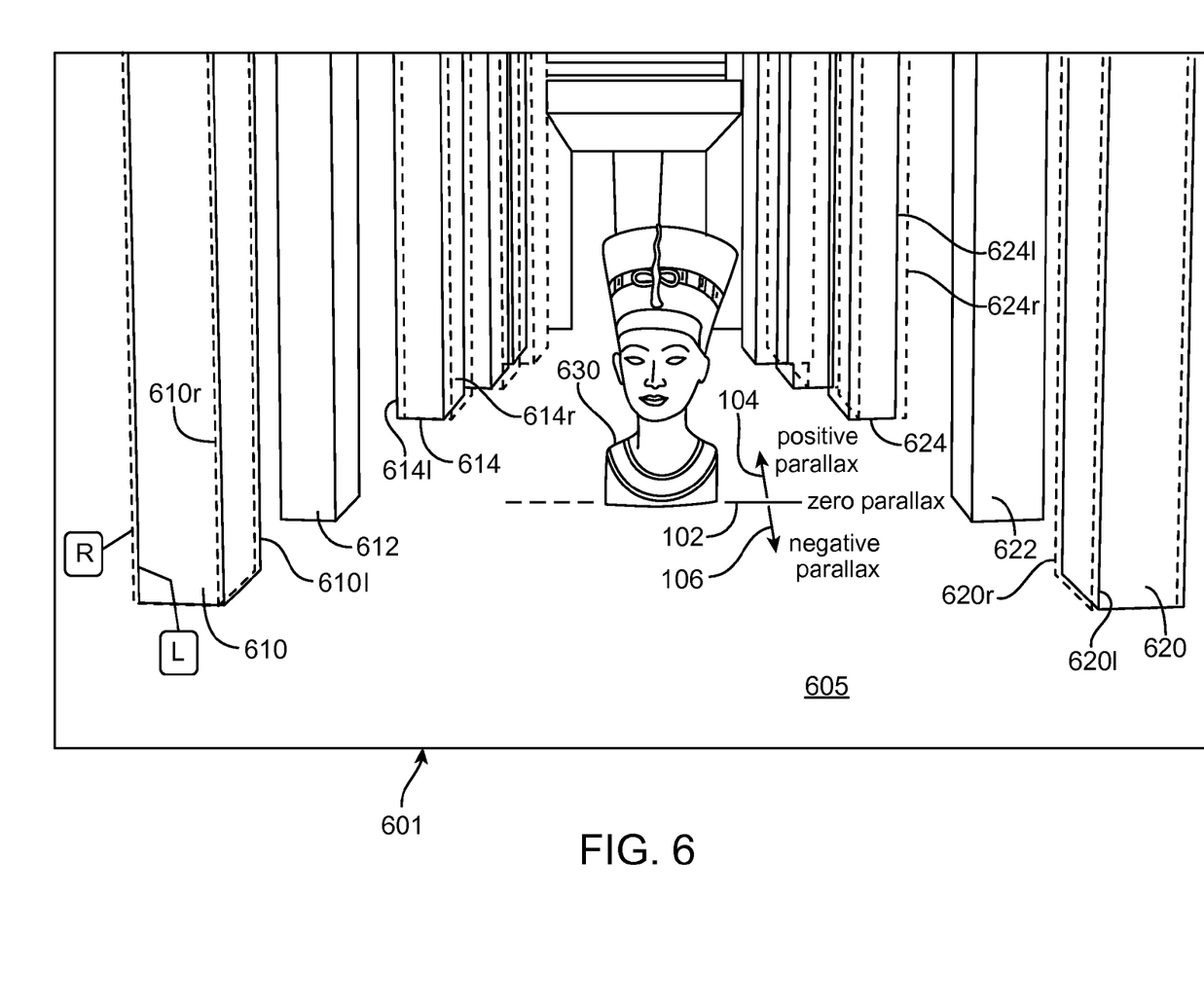
FIG. 6 is a front, perspective view of a combined left and right image of an image illustrating the placement of the zero parallax plane.

As illustrated in FIG. 2, the first and second perspective views 221 and 251 comprise views of the virtual objects such as virtual object 212 and the images of the reality-based environment 213 in an embodiment. In alternate embodiments, the first and second perspective views 221 and 251 comprise views of the virtual objects such as virtual object 212 without the images of the reality-based environment as shown in FIG. 6 and discussed below.

In one or more embodiments, the mobile computing device 200 is configured to continuously monitor the images of the reality-based environment 213, continuously synchronize the position of the zero parallax plane 102 between the markers 216 and the virtual object 212, and continuously update and register the first and second perspective views 221 and 251 of the virtual object 212. As such, the mobile computing device 200 is configured to alter the first and second perspective views 221 and 251 in response to a change in the distance 210 or orientation of the camera 202 relative to the real physical objects 213.

In one or more embodiments, the mobile device 200 may comprise a head mounted display or a smart phone or tablet. Embodiments employing a smart phone or tablet may employ a headset or glasses for placing the display 204 or the smart phone in front of the eyes of a user.

Figure 3:
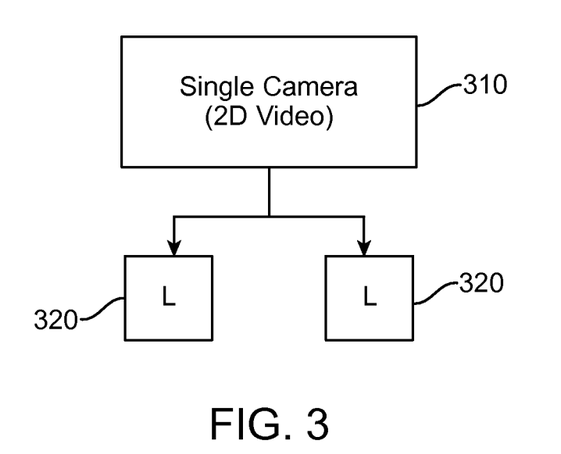
FIG. 3 is a schematic diagram depicting a single camera providing two identical left images.
Figure 4:
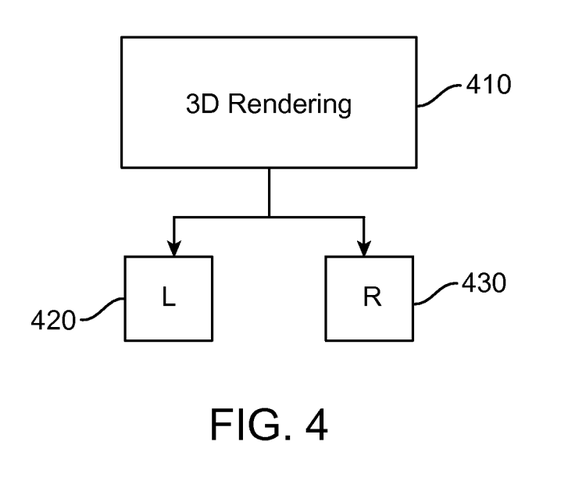
FIG. 4 is a schematic diagram of a three-dimensional ("3D") rendering providing a left and a right image.

FIGS. 3 and 4 contrast the differences between images generated by a single camera from images generated by a 3D rendering. FIG. 3 is a schematic diagram depicting a single camera 310 providing two identical left images 320. The single camera 310 generates only one perspective view 320. However, FIG. 4 depicts a schematic diagram of a three-dimensional (3D) rendering 410 providing a left and a right image 420 and 430.

Figure 5:
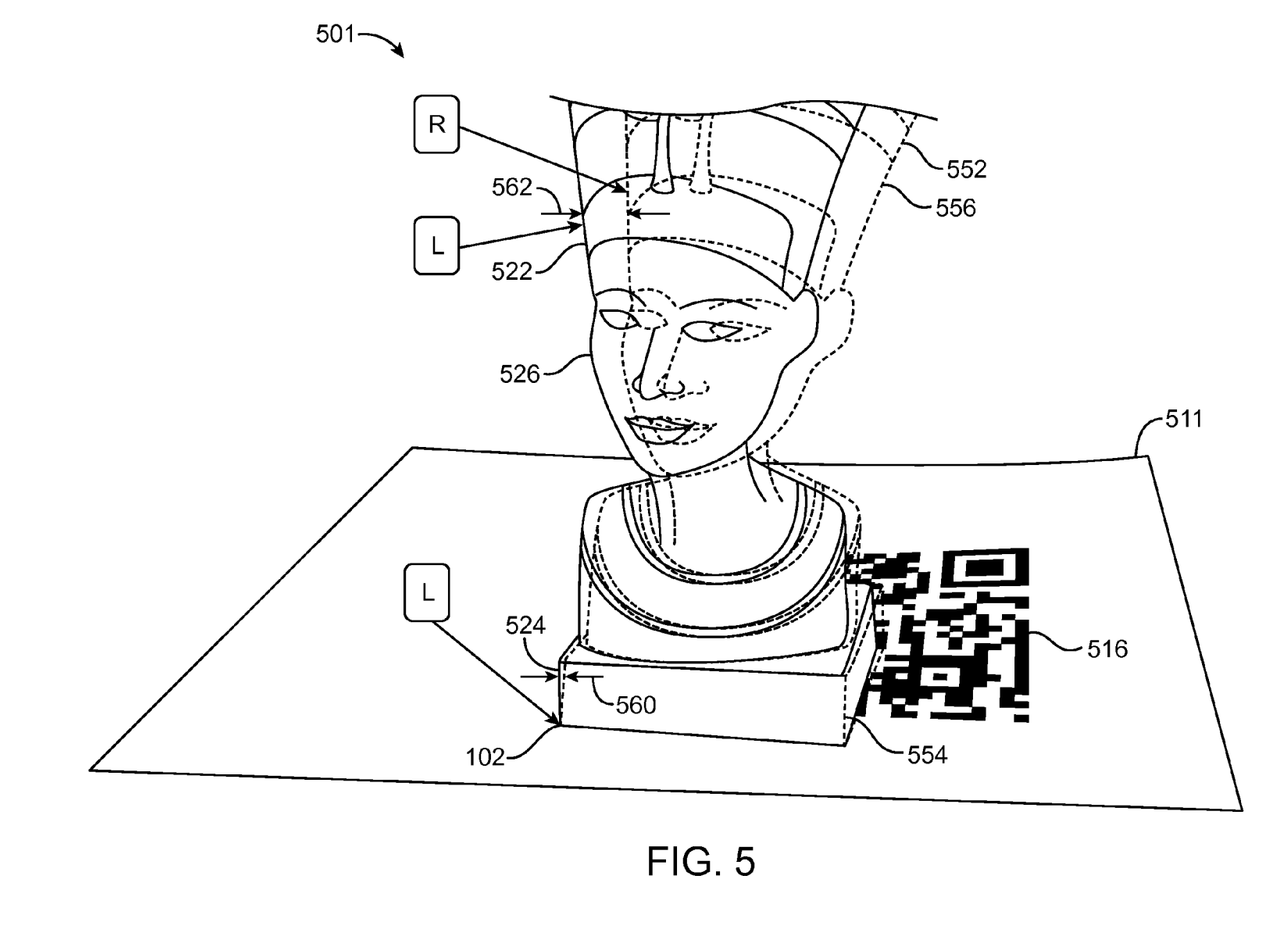
FIG. 5 is a front, perspective view of a combined left and right image of a virtual object.

FIG. 5 is a front, perspective view of the augmented reality environment 501 having a combined left and right perspective views 522 and 552 of a virtual statue. The left perspective view 522 (drawn with solid lines) comprises the left perspective views 522 of the virtual statue base 524 and the virtual statue bust 526. Likewise, the right perspective view 552 (drawn with dashed lines) comprises the right perspective views 552 of the virtual statue base 554 and the virtual statue bust 556. The virtual statue appears to be standing upon an image of a sheet 514 having one or more markers 516. The sheet 514 and the markers 516 represent a two-dimensional video of the real-world environment.

In one or more embodiments, the zero parallax plane 102 is positioned at the base of the virtual statue. In the region close to the zero parallax plane 102, the separation 560 between left and right perspective views near zero parallax is minimal. When left and right perspective views of the virtual objects 522 and 552 are identical or nearly identical close to the zero parallax plane 102 (i.e., L=R at the intersection point between 3D and 2D video), the user experiences comfortable stereo. At this intersection point between 2D Video and 3D object, the left and right images are the same without separation. Which means that 2D real-world video and 3D virtual object match.

In the region further away from the zero parallax plane 102, the separation 562 between left and right perspective views near zero parallax is larger (designated by the R and the L on FIG. 5). Hence, the differing left and right perspective views 522 and 552 achieve a 3D effect. However, since there are no two-dimensional images visible near this region away from the zero parallax plane, the user still experiences comfortable stereo viewing.

FIG. 6 is a front, perspective view of a virtual reality environment 601 having a combined left and right perspective views of virtual objects. An image of a statue 630 is depicted in a room 605 comprising columns 610, 612, 614, 620, 622, 624, and so forth. As used herein, the objects labeled with a reference having an "l" (depicted as solid lines) represent the left perspective view and the objects labeled with a reference having an "r" (depicted as dashed lines) represent the right perspective view.

In one or more embodiments, the zero parallax plane 102 is positioned at the image of the statue 630, separating the room 605 into the negative parallax region 106 and positive parallax region 104. As the statue 630 and the columns 612 and 622 are positioned at the zero parallax plane 102, the left and right perspective views of the statue 630 and the column 612 are identical.

Figure 7:
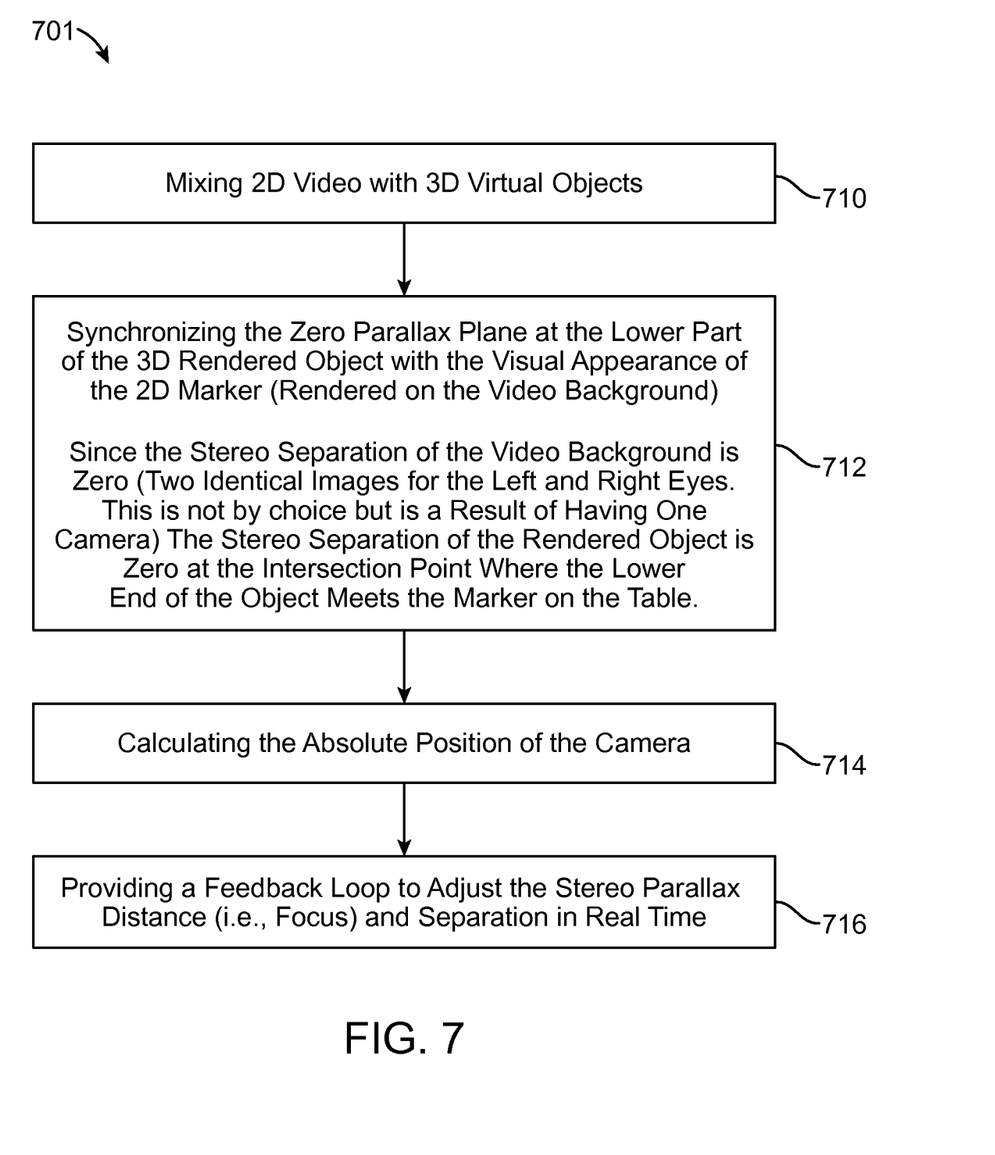
FIG. 7 is a flow chart depicting an exemplary process for combining two-dimensional ("2D") video with 3D virtual objects.

Images of virtual objects away from the zero parallax plane 102 have differing left and right perspective views. For example, columns 610 and 620 are positioned in front of the image of the statue 630 in the negative parallax region 106, and are represented by left and right perspective views of column 610 as 610*l* and 610*r*, and column 620 as 620*l* and 620*r* respectively. Similarly, columns 614 and 624 are positioned behind the image of the statue 630 in the positive parallax region 104, and are represented by left and right perspective views of column 614 as 614*l* and 614*r*, and of column 624 as 624*l* and 624*r* respectively FIG. 7 is a flow chart 701 depicting an exemplary process for providing 2D video with 3D virtual objects. 2D video is mixed with 3D virtual objects in a mobile computing device 200 (step 710). The zero parallax plane 102 is synchronized at the lower part of the 3D rendered object 212 with the visual appearance of the 2D marker 216 (rendered on the video background). Since the stereo separation of the video background is zero (two identical images for the left and right eyes—this is not by choice but is a result of having one camera). The stereo separation of the rendered object is zero at the intersection point where the lower end of the object meets the marker on the table. (step 712). The absolute position of the camera is calculated (step 714). A feedback loop is provided to adjust the stereo parallax distance (i.e., focus) and separation in real time (step 716).

Figure 8:
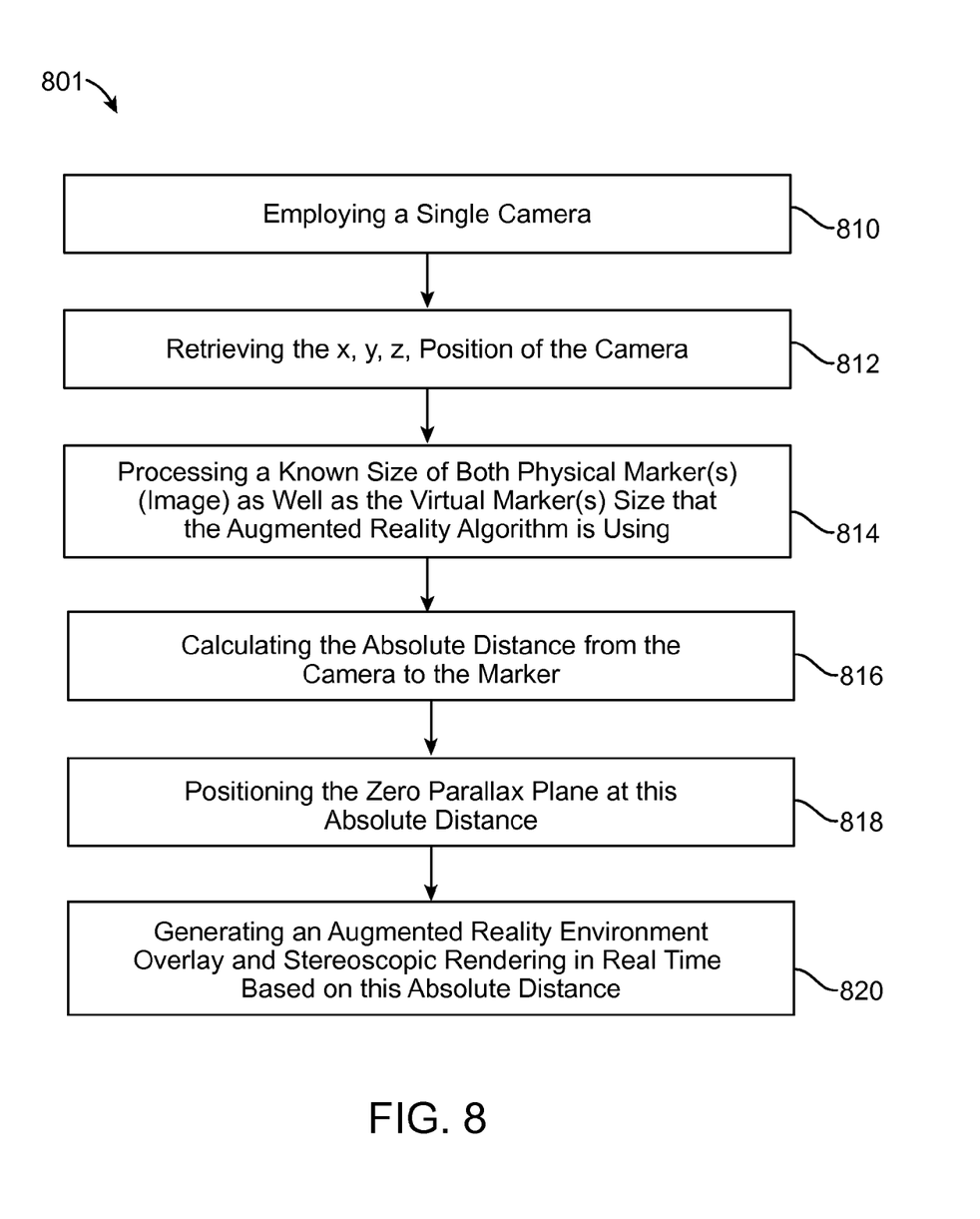
FIG. 8 is a flow chart depicting an exemplary process for positioning a zero parallax plane in a 2D video.

FIG. 8 is a flow chart 801 depicting an exemplary process for positioning a zero parallax plane in a 2D video. A single camera 202 is employed (step 810). The {x, y, z} position of the camera 202 is retrieved (step 812). A known size of both physical marker(s) 216 (image) as well as the virtual marker(s) size that the augmented reality algorithm is using is processed (step 814). The absolute distance 210 from the camera 202 to the marker is calculated (step 816). The zero parallax plane 102 is positioned at this absolute distance 210 (step 818). An augmented reality environment overlay and stereoscopic rendering in real time based on this absolute distance is generated.

Figure 9:
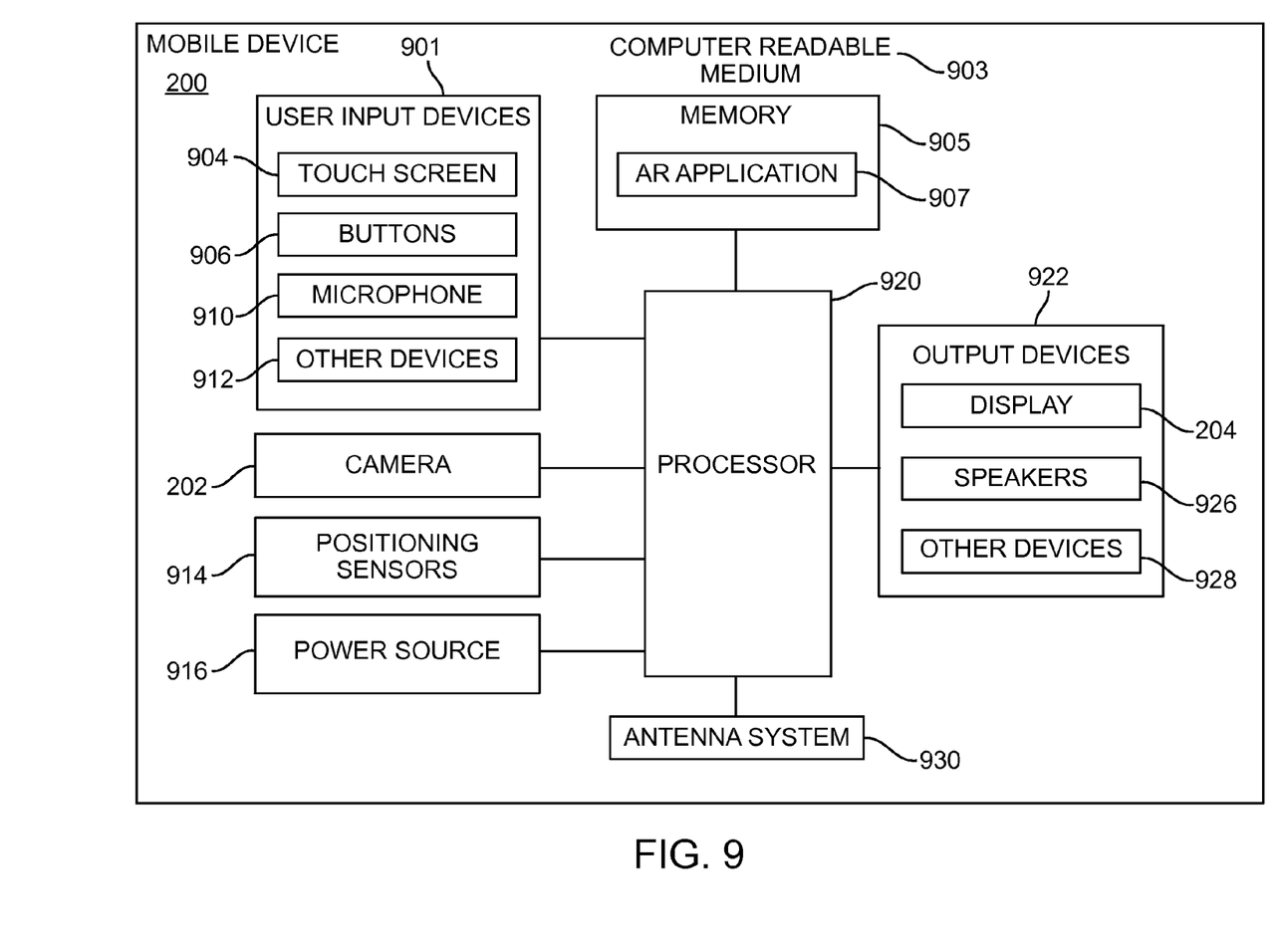
FIG. 9 is a schematic diagram of a mobile device in one or more embodiments.

FIG. 9 is a schematic diagram of a mobile device 200 in one or more embodiments. The mobile device 200 has a processor 920 which controls the mobile device 200. The various devices in the mobile device 200 may be coupled by one or more communication buses or signal lines. The processor 920 may be general purpose computing device such as a controller or microprocessor for example. In an embodiment, the processor 920 may be a special purpose computing device such as an Application Specific Integrated Circuit ("ASIC"), a Digital Signal Processor ("DSP"), or a Field Programmable Gate Array ("FPGA"). The mobile device 200 has a memory 905 which communicates with processor 920. The memory 905 may have one or more applications such as the Augmented Reality ("AR") application 907. The memory 905 may reside in a computer or machine readable non-transitory medium 903 which, when executed, cause a data processing system or processor 920 to perform methods described herein.

The mobile device 200 has a set of user input devices 901 coupled to the processor 920, such as a touch screen 904, one or more buttons 906, a microphone 910, and other devices 912 such as keypads, touch pads, pointing devices, accelerometers, or other user input devices coupled to the processor 920, as well as other input devices such as infrared ports, USB ports, pointer devices, or thumb wheel devices. The touch screen 904 and a touch screen controller may detect contact, break, or movement using touch screen technologies such as infrared, resistive, capacitive, surface acoustic wave technologies, as well as proximity sensor arrays for determining points of contact with the touch screen 904. Reference is made herein to users interacting with mobile devices such as through displays, touch screens, buttons, or tapping of the side of the mobile devices as non-limiting examples. Other devices for a user to interact with a computing device include microphones for accepting voice commands, a rear facing camera for recognizing facial expressions or actions of the user, accelerometers or other devices for detecting motions of the device, and annunciating speakers for tone or sound generation are contemplated in one or more embodiments.

The mobile device 200 may also have a camera 202, positioning sensors 914, and a power source 916. The positioning sensors 914 may include GPS sensors or proximity sensors for example. The power source 916 may be a battery such as a rechargeable or non-rechargeable nickel metal hydride or lithium battery for example. The processor 920 may be coupled to an antenna system 930 configured to transmit or receive voice, digital signals, and media signals.

The mobile device 200 may also have output devices 922 coupled to the processor 920. The output devices 922 may include a display 204, one or more speakers 926, and other output devices 978. The display 204 may be an LCD display device.

Although the invention has been discussed with reference to specific embodiments, it is apparent and should be understood that the concept can be otherwise embodied to achieve the advantages discussed. The preferred embodiments above have been described primarily as 3D augmented reality with comfortable 3D viewing. In this regard, the foregoing description is presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

Unless specifically stated otherwise, it shall be understood that disclosure employing the terms "processing," "computing," "determining," "calculating," and others refer to a data processing system or other electronic device manipulating or transforming data within the device memories or controllers into other data within the system memories or registers.

One or more embodiments may be implemented in computer software firmware, hardware, digital electronic circuitry, and computer program products which may be one or more modules of computer instructions encoded on a computer readable medium for execution by or to control the operation of a data processing system. The computer readable medium may be a machine readable storage substrate, flash memory, hybrid types of memory, a memory device, a machine readable storage device, random access memory ("RAM"), read-only memory ("ROM"), a magnetic medium such as a hard-drive or floppy disk, an optical medium such as a CD-ROM or a DVR, or in combination for example. A computer readable medium may reside in or within a single computer program product such as a CD, a hard-drive, or computer system, or may reside within different computer program products within a system or network. The computer readable medium can store software programs that are executable by the processor 920 and may include operating systems, applications, and related program code. The machine readable non-transitory medium storing executable program instructions which, when executed, will cause a data processing system to perform the methods described herein. When applicable, the ordering of the various steps described herein may be changed, combined into composite steps, or separated into sub-steps to provide the features described herein.

Computer programs such as a program, software, software application, code, or script may be written in any computer programming language including conventional technologies, object oriented technologies, interpreted or compiled languages, and can be a module, component, or function. Computer programs may be executed in one or more processors or computer systems.

What is claimed is:

1. A machine implemented method for generating an augmented reality environment, the method comprising:
receiving images of a reality-based environment with a computing device having a single camera, the reality-based environment having one or more real physical objects, the computing device having a display;
determining the distance and orientation of the camera relative to the real physical objects;
determining a location of a zero parallax plane in the reality-based environment;
generating a first and a second perspective views of one or more computer-generated, three-dimensional virtual objects, the virtual objects registered to the real physical objects based on the zero parallax plane; and,
displaying the first and second perspective views on the display of the computing device.

2. The machine implemented method for generating an augmented reality environment of claim 1, wherein the reality-based environment further comprises one or more markers.

3. The machine implemented method for generating an augmented reality environment of claim 1, wherein the location of the zero parallax plane is positioned at the bottom portion of the virtual object.

4. The machine implemented method for generating an augmented reality environment of claim 1, wherein determining the distance and orientation of the camera relative to the real physical objects comprises:
determining the distance of the camera relative to the real physical objects based on a relative scale size of the images of the real physical objects; and,
determining the orientation of the camera relative to the real physical objects based on a relative positioning of the images of the real physical objects.

5. The machine implemented method for generating an augmented reality environment of claim 1, further comprising altering the first and second perspective views in response to a change in the distance or orientation of the camera relative to the real physical objects.

6. The machine implemented method for generating an augmented reality environment of claim 1, wherein the first and second perspective views comprise views of the virtual objects and the images of the reality-based environment.

7. The machine implemented method for generating an augmented reality environment of claim 1, wherein the first and second perspective views comprise views of the virtual objects without the images of the reality-based environment.

8. The machine implemented method for generating an augmented reality environment of claim 1, further comprising:
continuously monitoring the images of the reality-based environment;
continuously synchronizing the position of the zero parallax plane between the marker and the virtual object; and,
continuously updating and registering the first and second perspective views of the virtual object.

9. The machine implemented method for generating an augmented reality environment of claim 1, wherein:
the first perspective view is displayed on the left side of the display;
the second perspective view is displayed on the right side of the display; and,
the first perspective view differs from the second perspective view.

10. A machine readable non-transitory medium storing executable program instructions which when executed cause a data processing system to perform a method comprising:
receiving images of a reality-based environment with a computing device having a single camera, the reality-based environment having one or more real physical objects, the computing device having a display;
determining the distance and orientation of the camera relative to the real physical objects;
determining a location of a zero parallax plane in the reality-based environment;
generating a first and a second perspective views of one or more computer-generated, three-dimensional virtual objects, the virtual objects registered to the real physical objects based on the zero parallax plane; and,
displaying the first and second perspective views on the display of the computing device.

11. The machine readable non-transitory medium storing executable program instructions which when executed cause the data processing system to perform the method of claim 10, wherein the reality-based environment further comprises one or more markers.

12. The machine readable non-transitory medium storing executable program instructions which when executed cause the data processing system to perform the method of claim 10, wherein the location of the zero parallax plane is positioned at the bottom portion of the virtual object.

13. The machine readable non-transitory medium storing executable program instructions which when executed cause the data processing system to perform the method of claim 10, wherein determining the distance and orientation of the camera relative to the real physical objects comprises:
determining the distance of the camera relative to the real physical objects based on a relative scale size of the images of the real physical objects; and,
determining the orientation of the camera relative to the real physical objects based on a relative positioning of the images of the real physical objects.

14. The machine readable non-transitory medium storing executable program instructions which when executed cause the data processing system to perform the method of claim 10, further comprising altering the first and second perspective views in response to a change in the distance or orientation of the camera relative to the real physical objects.

15. The machine readable non-transitory medium storing executable program instructions which when executed cause the data processing system to perform the method of claim 10, wherein the first and second perspective views comprise views of the virtual objects and the images of the reality-based environment.

16. The machine readable non-transitory medium storing executable program instructions which when executed cause the data processing system to perform the method of claim 10, wherein the first and second perspective views comprise views of the virtual objects without the images of the reality-based environment.

17. The machine readable non-transitory medium storing executable program instructions which when executed cause the data processing system to perform the method of claim 10, further comprising:
continuously monitoring the images of the reality-based environment;
continuously synchronizing the position of the zero parallax plane between the marker and the virtual object; and,
continuously updating and registering the first and second perspective views of the virtual object.

18. The machine readable non-transitory medium storing executable program instructions which when executed cause the data processing system to perform the method of claim 10, wherein:
the first perspective view is displayed on the left side of the display;
the second perspective view is displayed on the right side of the display; and,
the first perspective view differs from the second perspective view.

19. A mobile device comprising:
a single camera;
at least one processing system coupled to the single camera, the at least one processing system having one or more processors configured to generate an augmented reality environment, the at least one processing system operable to perform the operations including:
receiving images of a reality-based environment with a computing device having a single camera, the reality-based environment having one or more real physical objects, the computing device having a display;
determining the distance and orientation of the camera relative to the real physical objects;
determining a location of a zero parallax plane in the reality-based environment;
generating a first and a second perspective views of one or more computer-generated, three-dimensional virtual objects, the virtual objects registered to the real physical objects based on the zero parallax plane; and,
displaying the first and second perspective views on the display of the computing device.

20. The mobile device of claim 19, wherein the at least processing system is further operable to perform the operations comprising:
continuously monitoring the images of the reality-based environment;
continuously synchronizing the position of the zero parallax plane between the marker and the virtual object; and,
continuously updating and registering the first and second perspective views of the virtual object.

\* \* \* \* \*